No. 714,313. Patented Nov. 25, 1902.
D. LUBIN.
POWER DEVICE.
(Application filed June 10, 1902.)
(No Model.) 5 Sheets—Sheet 1.
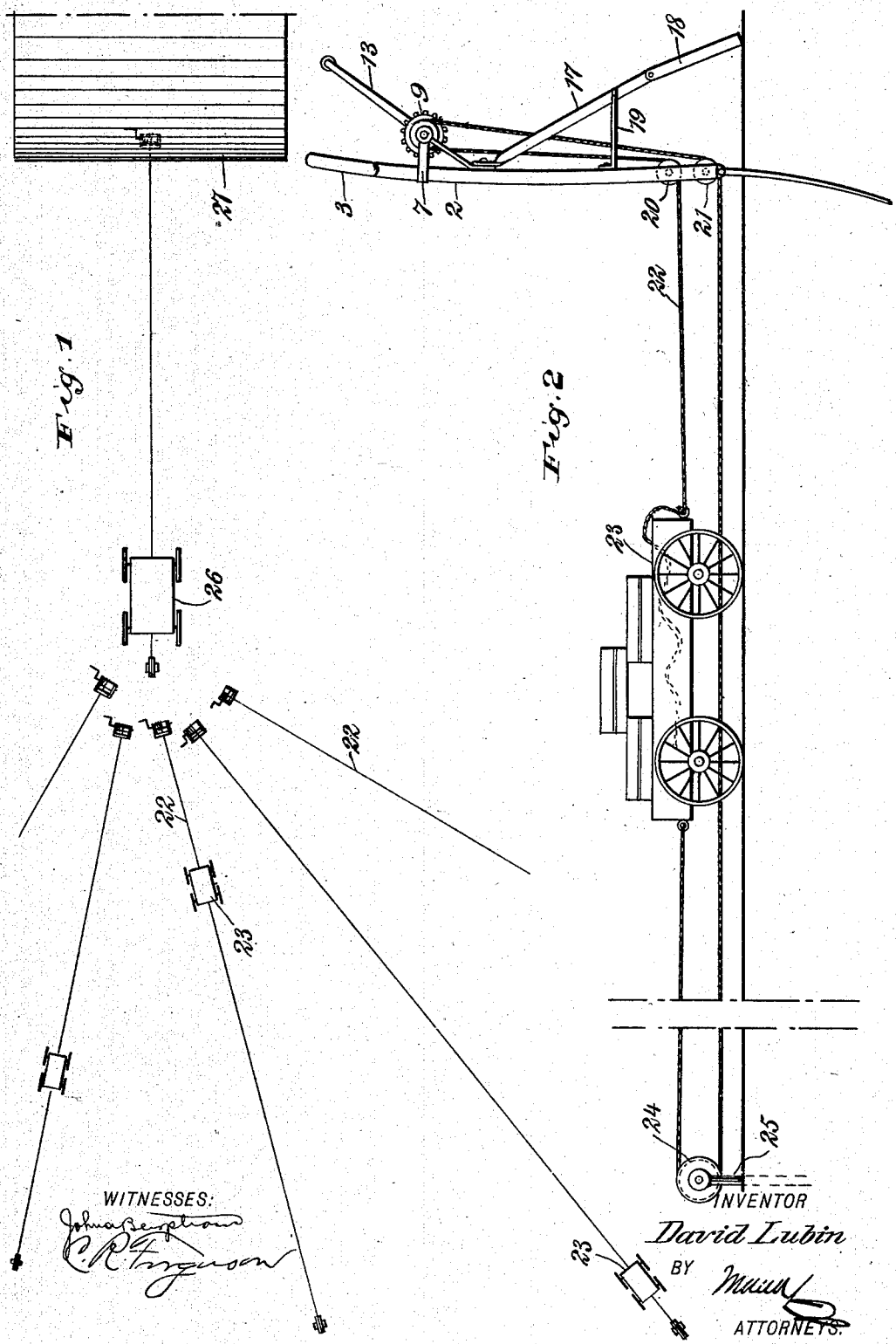

No. 714,313. Patented Nov. 25, 1902.
D. LUBIN.
POWER DEVICE.
(Application filed June 10, 1902.)
(No Model.) 5 Sheets—Sheet 2.
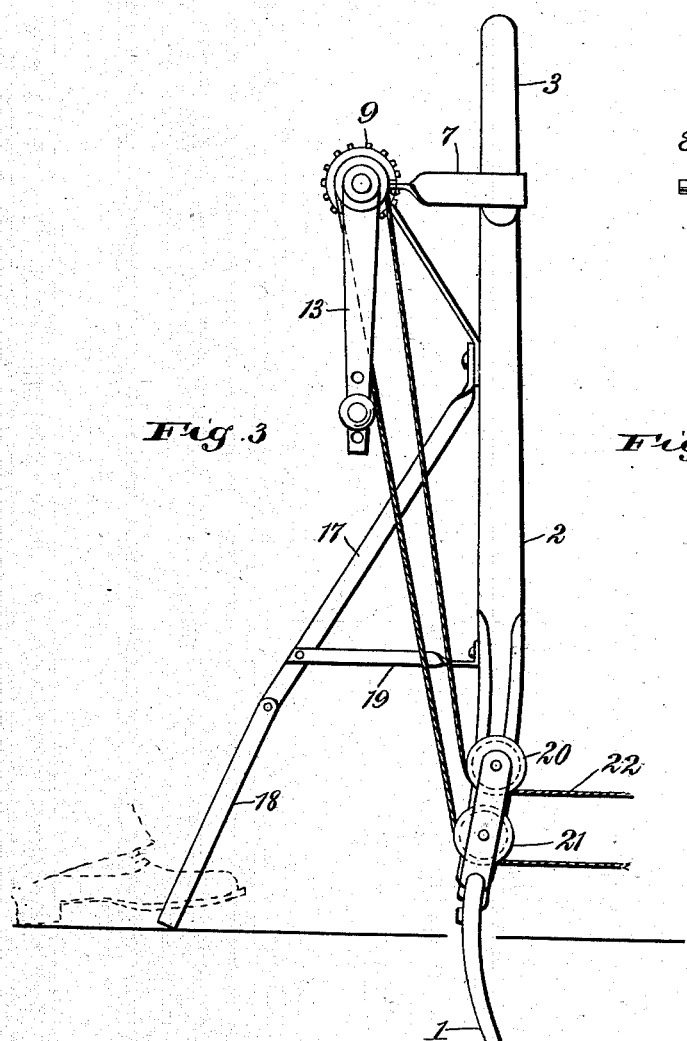
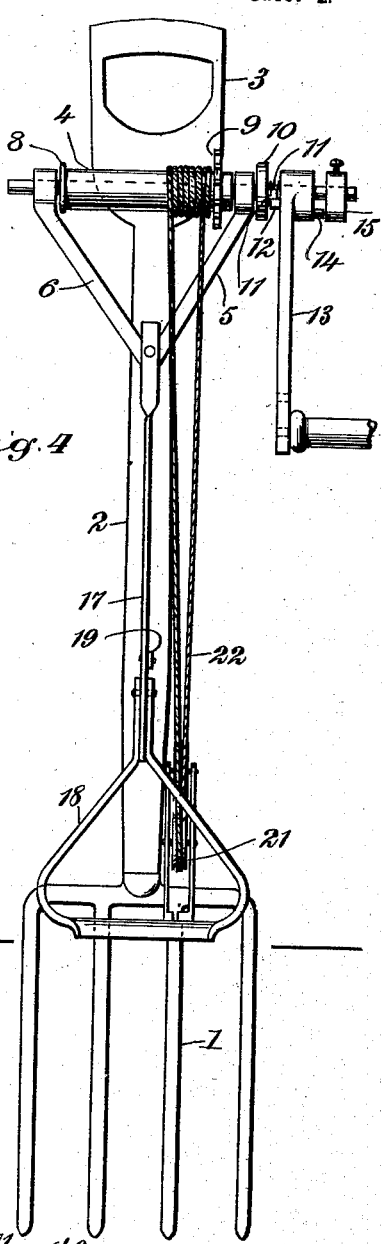
WITNESSES:
INVENTOR
David Lubin
BY
ATTORNEYS.

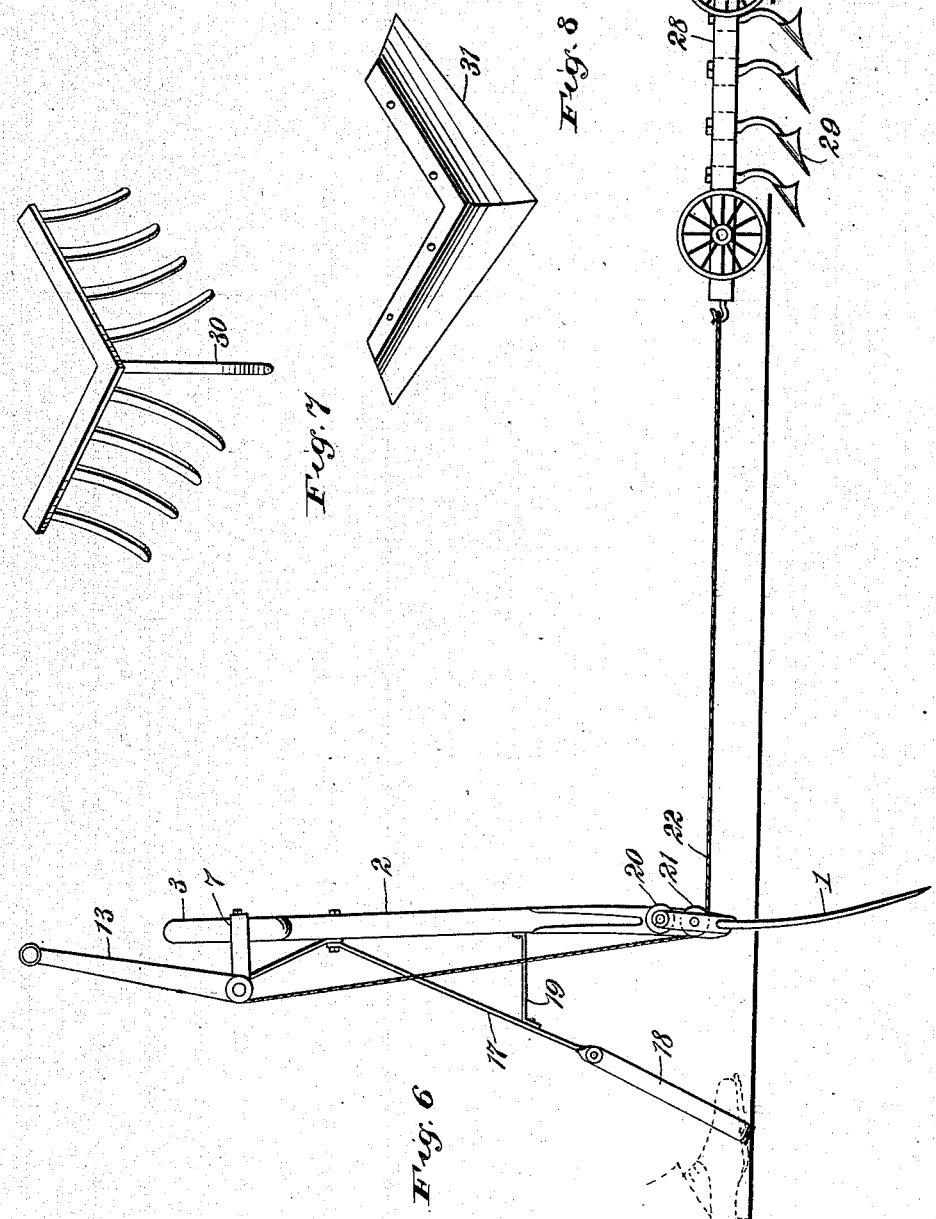

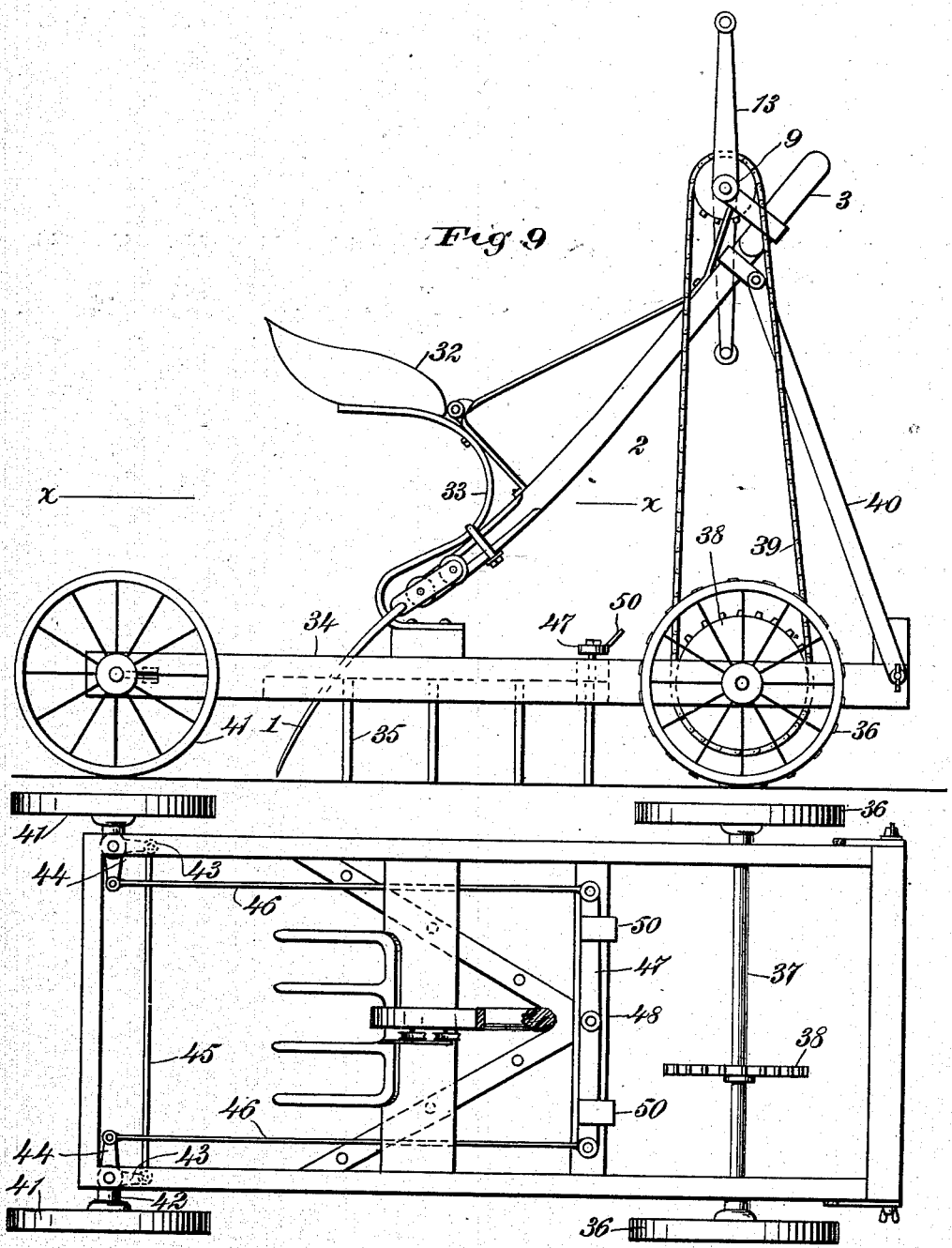

No. 714,313. Patented Nov. 25, 1902.
D. LUBIN.
POWER DEVICE.
(Application filed June 10, 1902.)
(No Model.) 5 Sheets—Sheet 5.
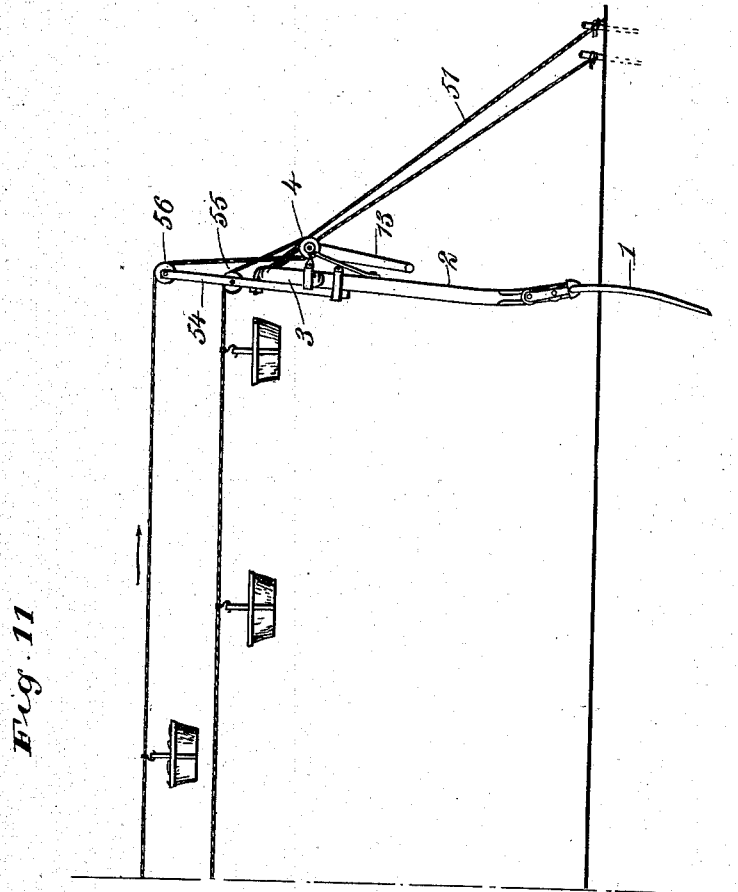
Fig. 11
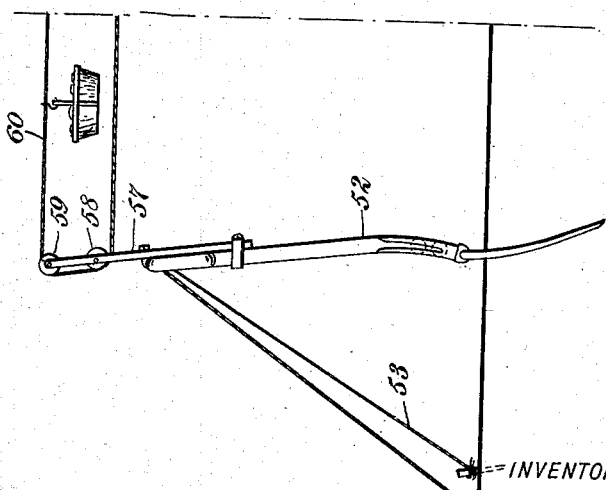
WITNESSES:
Joshua Bengston
C. R. Ferguson
INVENTOR
David Lubin
BY
ATTORNEYS.

UNITED STATES PATENT OFFICE.

DAVID LUBIN, OF NEW YORK, N. Y.

POWER DEVICE.

SPECIFICATION forming part of Letters Patent No. 714,313, dated November 25, 1902.

Application filed June 10, 1902. Serial No. 111,023. (No model.)

*To all whom it may concern:*

Be it known that I, DAVID LUBIN, a citizen of the United States, and a resident of the city of New York, borough of Manhattan, in the county and State of New York, have invented a new and Improved Power Device, of which the following is a full, clear, and exact description.

This invention relates to improvements in power devices, the object being to provide a manually-operated power mechanism of simple construction that will be found of great utility and adapted for a variety of uses on a farm, such as drawing vehicles loaded with berries or other products to a central or delivery station and for drawing or propelling tillage implements.

I will describe a power device embodying my invention and then point out the novel features in the appended claims.

Reference is to be had to the accompanying drawings, forming a part of this specification, in which similar characters of reference indicate corresponding parts in all the figures.

Figure 1 is a plan view showing the power devices embodying my invention as employed in drawing vehicles from various points of a field to a central point. Fig. 2 is a side elevation showing the connection of the device with a vehicle. Fig. 3 is a side elevation of the device. Fig. 4 is an elevation at right angles to Fig. 3. Fig. 5 is a detail showing the winding mechanism employed. Fig. 6 shows the power as applied to a cultivator. Figs. 7 and 8 illustrate implements that may be substituted for the cultivator-teeth. Fig. 9 is a side elevation showing the power as used for propelling a wheeled harrow. Fig. 10 is a section on the line *x x* of Fig. 9, and Fig. 11 is an elevation showing the power as applied for carrying baskets of fruit or the like from one place to another.

The power device comprises a portable anchor carrying a winding-drum. Preferably the anchor consists of a tined fork 1, having a handle 2 of the usual construction, and upon the upper end of the handle is the hand-yoke 3. I prefer to use the fork as shown, because it may be readily inserted in the ground, and its tines by being curved in the direction of strain will cause it to hold more firmly in the ground, because there will not only be a direct forward strain, but also an upward pressure in the ground.

Supported on the handle is the winding-drum 4. This winding-drum has its shaft-bearings in arms 5 6, attached to the handle 2. At the upper portions of these arms 5 6 are braces 7, which extend to the hand-yoke 3. A flange or washer 8 is attached to one end of the winding-drum, while at the other end a sprocket-wheel 9 is secured. This sprocket-wheel 9 serves as a flange or washer and also serves another purpose, as will hereinafter appear.

Connected to the shaft at the sprocket end of the drum is a collar 10, having a lug 11, designed to be engaged by a lug 12, extended from a portion of the crank-handle 13, which surrounds the shaft. On the opposite portion of the handle is a pin 14, designed when the machine is operated to engage with the flat inner surface of a collar 15, connected with the shaft, but at other times to enter either one of the recesses 16, formed at opposite sides of the collar 15 at the inner surface, the object of which will be hereinafter explained.

A stirrup-supporting rod 17 extends downward at an outward angle from the rear side of the handle 2, and on the lower end of this rod 17 is a stirrup 18, in which an operator may place his foot, so that by his weight is provided a further means for steadying and holding the anchor. A brace 19 is connected at one end with the rod 17 and at the other end to the handle 2, as clearly shown in the drawings.

Arranged at the lower portion of the handle 2 are grooved pulleys 20 and 21, around which a draft-rope 22 extends, this draft-rope being engaged with the winding-drum by taking a series of turns around the same. When the draft-rope is employed for moving a vehicle back and forth along a certain road, it will be connected to the ends of the vehicle, here shown as a wagon 23, and then with the wagon becomes practically an endless rope. At a point distant from the power device a pulley 24 is supported by a stake 25 or the like driven into the ground, and around this pulley 24 the draft-rope passes.

In operation it is obvious that a person standing at a central point, such as indicated in Fig. 1, may wind the drum 4 in such a direction as to draw the vehicle toward the said central point, and obviously by rotating the drum in the opposite direction the vehicle may be returned for another load, it being understood when this use is made of the device that the vehicle will be drawn along the road at intervals or stopping at certain points to receive boxes of berries or other products. Upon reaching the central point the product may be removed from the vehicle and placed upon another vehicle 26, to be drawn by a power device, such as that described, to a packing or storing house 27. While operating the device, the operator will place his foot in the stirrup 18, as before described, and grasp the hand-yoke 3 with his left hand, and these two connections with the anchor device will not only aid in holding it firmly, but will give the operator a considerable purchase in rotating the crank-handle.

In Fig. 6 I have shown the power device as connected with a vehicle or carriage 28, to which cultivator-teeth 29 are attached. In this instance, however, as the cultivator is not to have a return movement there will be but one draft-rope, which may pass around either one of the pulleys 20 or 21. Instead of the cultivator-teeth 29 either one of the devices shown in Figs. 7 and 8 may be attached to the vehicle.

In Fig. 7 I have shown drag or harrow teeth 30, depending from divergent bars, and in Fig. 8 I have shown divergent plates 31, that may be employed for cutting weeds or the like.

In Figs. 9 and 10 I have shown the power as applied for propelling an agricultural tool mounted on the vehicle on which the operator may ride. As here shown, the handle 2 of the anchor serves practically as a support for an operator's seat 32, which is mounted on a spring 33. The tines 1 of the fork extend downward and at a rearward angle through the carriage 34 and serve as levelers for earth harrowed by the teeth 35. At the front end of the carriage are traction-wheels 36, and on the shaft 37 of these traction-wheels is a sprocket-wheel 38, around which a sprocket-chain 39 passes, the said sprocket-chain also passing around the sprocket-wheel 9, attached to the winding-drum. From the upper portion of the handle 2 divergent braces 40 extend downward and connect with opposite sides of the vehicle or carriage frame. The rear wheels 41 serve as steering-wheels. These wheels 41 are mounted on spindles 42, which swing on a vertical axis, and attached to the spindles are forwardly-extended arms 43 and inwardly-extended arms 44. The arms 43 are connected one with the other by means of a rod 45, while from the arms 44 steering-rods 46 extend forward and connect with opposite ends of a steering-bar 47, pivoted on a cross-bar 48 of the vehicle-frame.

In operating the device in its connection shown in Fig. 6 the winding-drum will be rotated until the agricultural tool is drawn up close to the anchor, and then the anchor is to be lifted and carried back to be again engaged in the ground at a suitable distance from the tool. During this carrying away or moving of the anchor the draft-rope is to unwind from the ground, and to permit the free rotation of the drum the crank-handle is to be moved sufficiently to place the lug 14 in line with one of the recesses 16, and then a spring 49, arranged between the collar 10 and the crank-handle, will move said crank-handle along the shaft, freeing the lug 12 from the lug 11.

In the operation of the device shown in Figs. 9 and 10 the operator while sitting on the seat 32 will rotate the drum by means of the two crank-handles shown. This rotation of the drum obviously, through the chain-gear, will rotate the traction-wheels, consequently moving the device over the ground. The operator may place his feet on the foot-plates 50, attached to the bar 47, and when it is desired to steer the vehicle around a tree, stump, or other obstruction he may deflect the steering-wheels by the pressure of one foot to swing the bar 47 as desired.

It may be here stated that this device will be found particularly useful in tilling ground where a considerable number of obstructions are found, and obviously may be caused to move in a circle around trees and the like.

In Fig. 11 the device is illustrated as serving to transport baskets of fruit from a portion of a field to a collecting-point. The power is located at this collecting-point and is braced by guys 51, while at a distant point an anchor 52 in the form of a fork is stuck in the ground and guyed by the ropes 53. Attached to and extended upward from the power device is a rod 54, on which are pulleys 55 56. A bar 57 extends up from the anchor 52, and on it are pulleys 58 59. A rope 60 engages with the several pulleys and with the winding-drum. Baskets may be hung on the two stretches of the rope and obviously will be moved in opposite directions.

Having thus described my invention, I claim as new and desire to secure by Letters Patent—

1. A power device comprising an anchoring device, a hand-yoke on the handle of the anchoring device, a winding-drum supported on the handle, and a pulley mounted on the handle.

2. A power device comprising an anchoring device, a winding-drum supported on the handle of the anchoring device, and a foot-stirrup having connection with the handle.

3. A power device comprising a fork having a hand-yoke on the upper end of its handle, a winding-drum supported on said handle at the upper portion, a rod extended downward and rearward from said handle, a stirrup having swinging connection with said rod, and a pulley on the handle.

4. A power device comprising a fork, a winding-drum supported on the handle of the fork, a sprocket-wheel connected with said winding-drum serving as a flange, and a crank-handle for the winding-drum.

5. A power device comprising a fork, a winding-drum supported on the handle of the fork, a crank-handle loosely mounted on the shaft of the drum, a clutch connection between said drum and handle, a lug extended outward from the outer side of the handle, a collar attached to the shaft, having a recess to receive said lug, and a spring for moving the handle to engage said lug in the recess.

6. A power device comprising a fork, a winding-drum supported on the handle of the fork, a foot-stirrup having connection with the handle, and a draft-rope extending from the winding-drum to a device to be moved over the ground.

In testimony whereof I have signed my name to this specification in the presence of two subscribing witnesses.

DAVID LUBIN.

Witnesses:
C. R. FERGUSON,
EVERARD BOLTON MARSHALL.